Aug. 31, 1943.   H. NUTT ET AL   2,328,091
FLUID OPERATED CLUTCH
Filed Sept. 30, 1938   5 Sheets-Sheet 1

Inventors:
Harold Nutt and
Richard L. Smirl.
By: Edward C. Gritzbaugh
Atty.

Inventors:
Harold Nutt and
Richard L. Smirl.

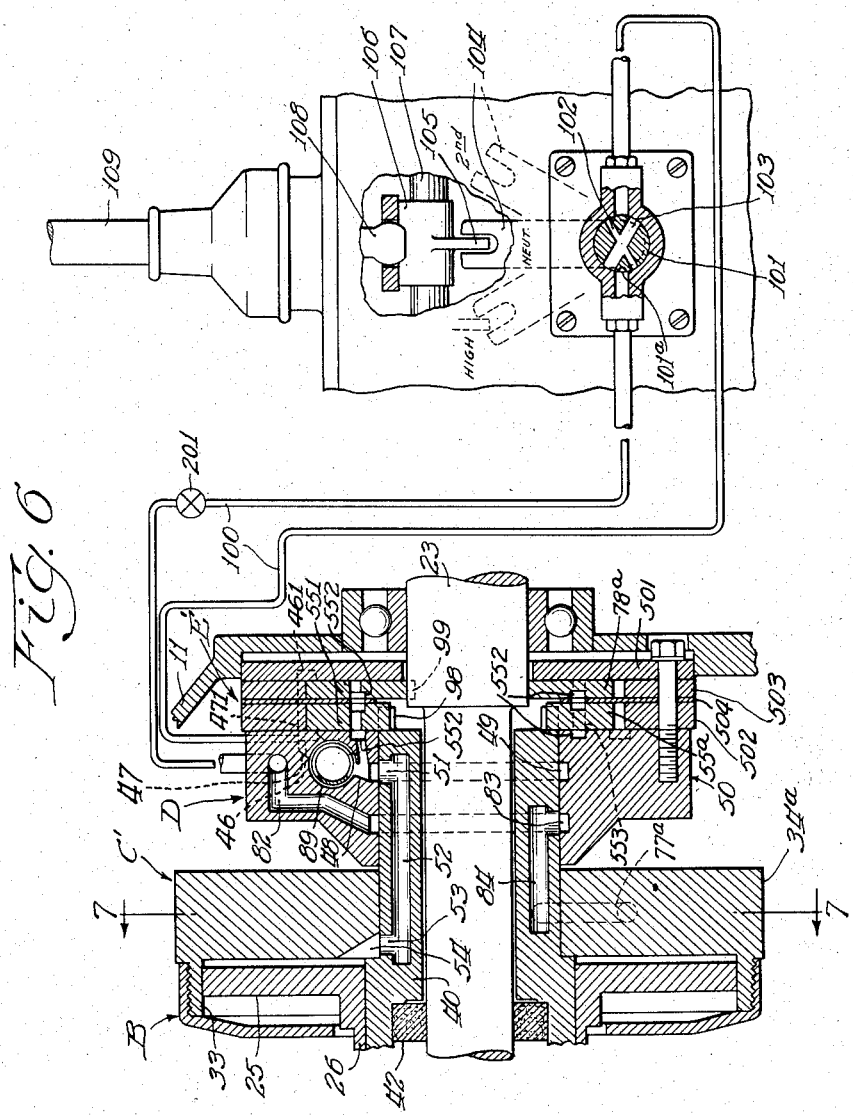

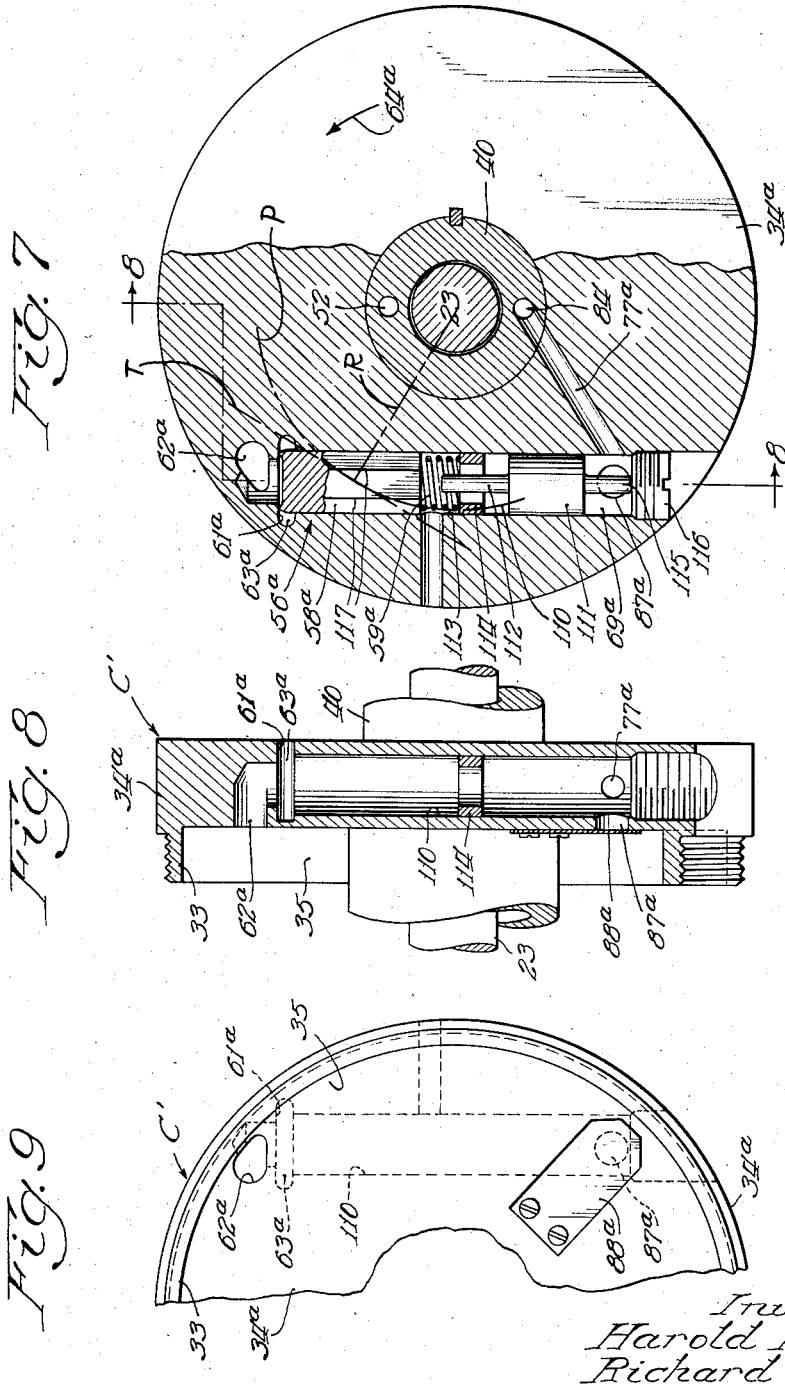

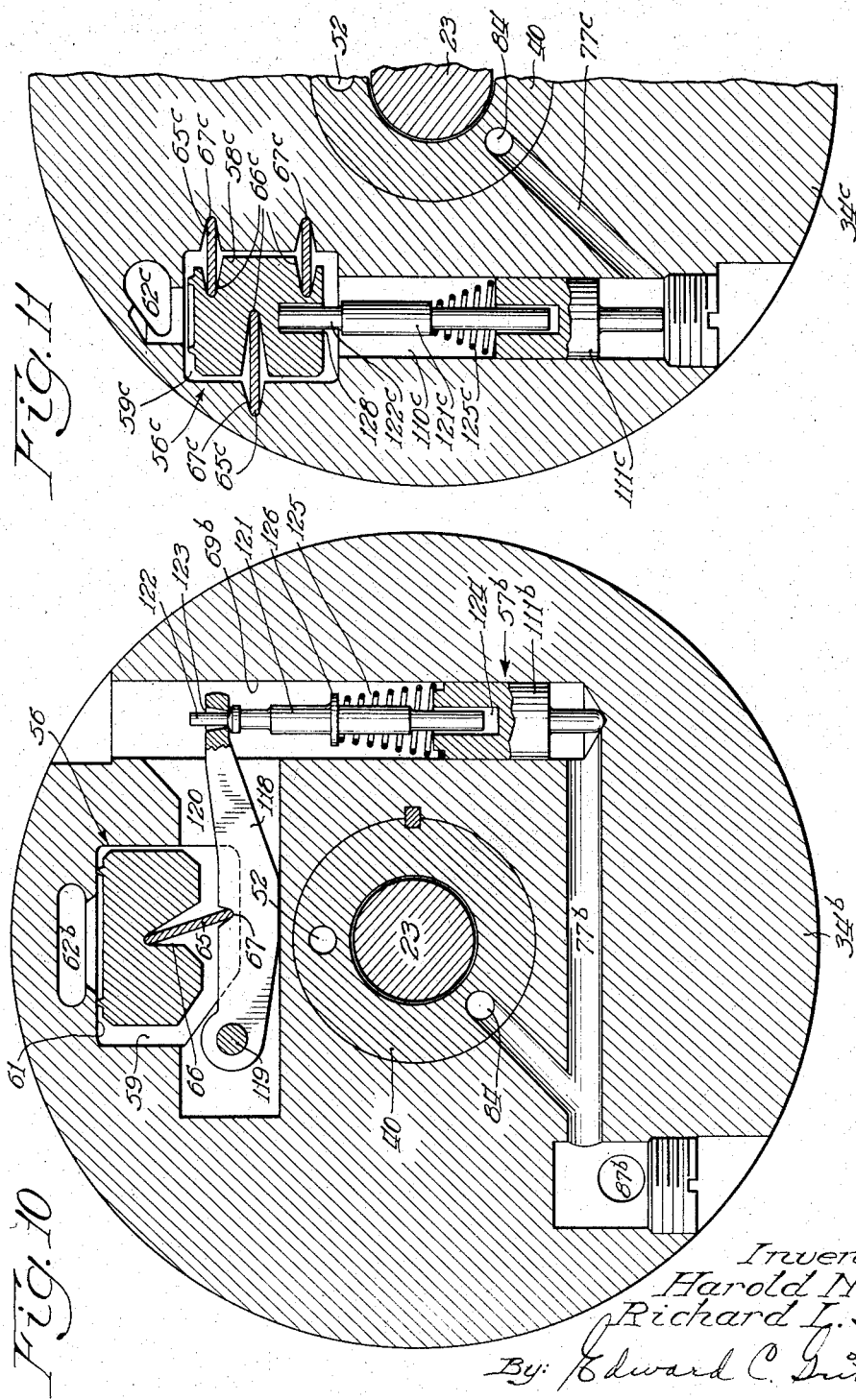

Patented Aug. 31, 1943

2,328,091

UNITED STATES PATENT OFFICE 2,328,091

FLUID OPERATED CLUTCH

Harold Nutt, Chicago, and Richard L. Smirl, Bellwood, Ill., assignors to Borg-Warner Corporation, Chicago, Ill., a corporation of Illinois Application September 30, 1938, Serial No. 232,664

43 Claims. (Cl. 192—3.5)

This invention, relating as indicated, to fluid operated clutches, has as its primary object to provide a clutch system wherein the fluid pressure is controlled by an automatic control valve, rotating with the driving side of the clutch, and adapted to govern the engaging pressure of the clutch (within certain limits, as will be more fully explained later) in direct proportion to the speed of rotation of the clutch. It has been previously proposed to control the fluid pressure in a clutch of this general type, by centrifugal force developed in governor weights and transmitted through mechanical linkage directly to some mechanical part of the clutch. Also, it has been proposed to control the application of fluid pressure to the clutch, by a centrifugally operated valve adapted to control the flow of fluid to the clutch without being affected by the pressure in the pressure chamber of the clutch.

The present invention greatly improves upon the performance and simplifies the construction of such clutches, by providing an arrangement wherein a control valve, arranged to rotate with one side of the clutch, directly impresses the centrifugal force which it develops as a result of such rotation, upon the fluid in the pressure chamber of the clutch. To this end, the valve is arranged so that the fluid in the pressure chamber reacts against an end of the valve element, tending to open the valve in opposition to centrifugal force tending to close it.

Another object of the invention is to secure the same initial clutch engagement under quick acceleration of the vehicle motor, as is effected under slow acceleration. It has been found that owing to the occurrence of an interval of delay in the starting of clutch engagement after the closing of the control valve at the predetermined speed, the initial engagement occurs at a definitely higher speed under quick acceleration than under slow acceleration, and as a result, some shock occurs under the faster accelerating condition. The invention aims to eliminate this shock so that engagement is as smooth as that occurring under slow acceleration.

To this end, the invention has as its object to provide, in a clutch system of the type mentioned, a relatively simple control valve wherein the movable valve element is mounted in such a way that it is urged toward closed position by both its own centrifugal force and its own torsional inertia.

Another important object of the invention is to provide a clutch system of the kind specified, which is more simple in the arrangement of its various parts, passages, and moving elements, than prior arrangements of the kind.

Another object of the invention is to provide a control valve which will not readily stick, and the action of which is relatively smooth.

In prior arrangements, it has been proposed to provide two fluid pumps, one driven from the engine and the other driven from the transmission, and each having an independent fluid circuit for performing its respective functions, the engine driven pump being employed for automatic operation of the clutch, and the transmission driven pump being employed for "locking out" the clutch against automatic operation during normal driving conditions and for push starting. Although in some of its aspects, the present invention contemplates improvements in this type of arrangement, one of the objects of the present invention is to provide a clutch system of the general type specified, wherein both pumps are adapted to deliver fluid to the clutch motor through a common fluid passage, in order that only one pump housing and one set of pump inlet and outlet ports may be made to serve both pump rotors.

This is made possible by providing an arrangement wherein the fluid which is made available for operating the lockout mechanism, is delivered also to the clutch operated fluid motor, the same as the fluid which is delivered for centrifugal operation of the clutch.

Another object of the invention is to provide a clutch system of the type specified, embodying a manual control valve which is not only much less complicated in construction and arrangement than valves for the same purpose in prior contemplated structures, but is also capable of exercising more complete and more flexible control over the clutch. In this respect, the invention contemplates a valve which is urged toward open position by the fluid pressure in the clutch operating motor, and toward closed position by a manual control element, connected to the valve through the medium of a resilient link, such as a coil spring under tension, whereby the pressure at which the valve will open may be varied by changing the position of the manual control element, and thereby shortening or lengthening the spring, and correspondingly modifying its tension. Also this valve serves as a pressure relief valve for the pump.

A further object of the invention is to provide a lockout device, which, although adapted to directly transmit the lockout pressure to the automatic control valve for locking the same in closed position, does not remain in hindering relation to the valve during the centrifugal stage of operation. To this end, the invention contemplates a lockout piston, subject to the pressure of the lockout fluid when the latter is made available, and thereby adapted to positively transmit such pressure to the control valve, but adapted, in the absence of pressure from the lockout fluid, to move away from the control valve and allow the latter to move freely under centrifugal control, without hindrance from the lockout mechanism.

Other objects, the advantages and uses of the invention will become apparent after reading the following specification and claims, and after consideration of the drawings forming a part of the specification, wherein:

Fig. 5 is a detail sectional view, taken as indicated by the line 5—5 of Fig. 3, the valve element being shown partly in section and partly in elevation;

Fig. 6 is a view, partly in axial section and partly schematic, of a modified form of the invention;

Fig. 7 is a transverse sectional view taken as indicated by the line 7—7 of Fig. 6;

Fig. 8 is a sectional view taken as indicated by the line 8—8 of Fig. 7;

Fig. 9 is a front elevation of a portion of the control valve housing;

Fig. 10 is a transverse sectional view of the control valve arrangement of a modified form of the invention; and Fig. 11 is a transverse sectional view of a portion of the control valve arrangement of another modification of the invention.

Figure 1:
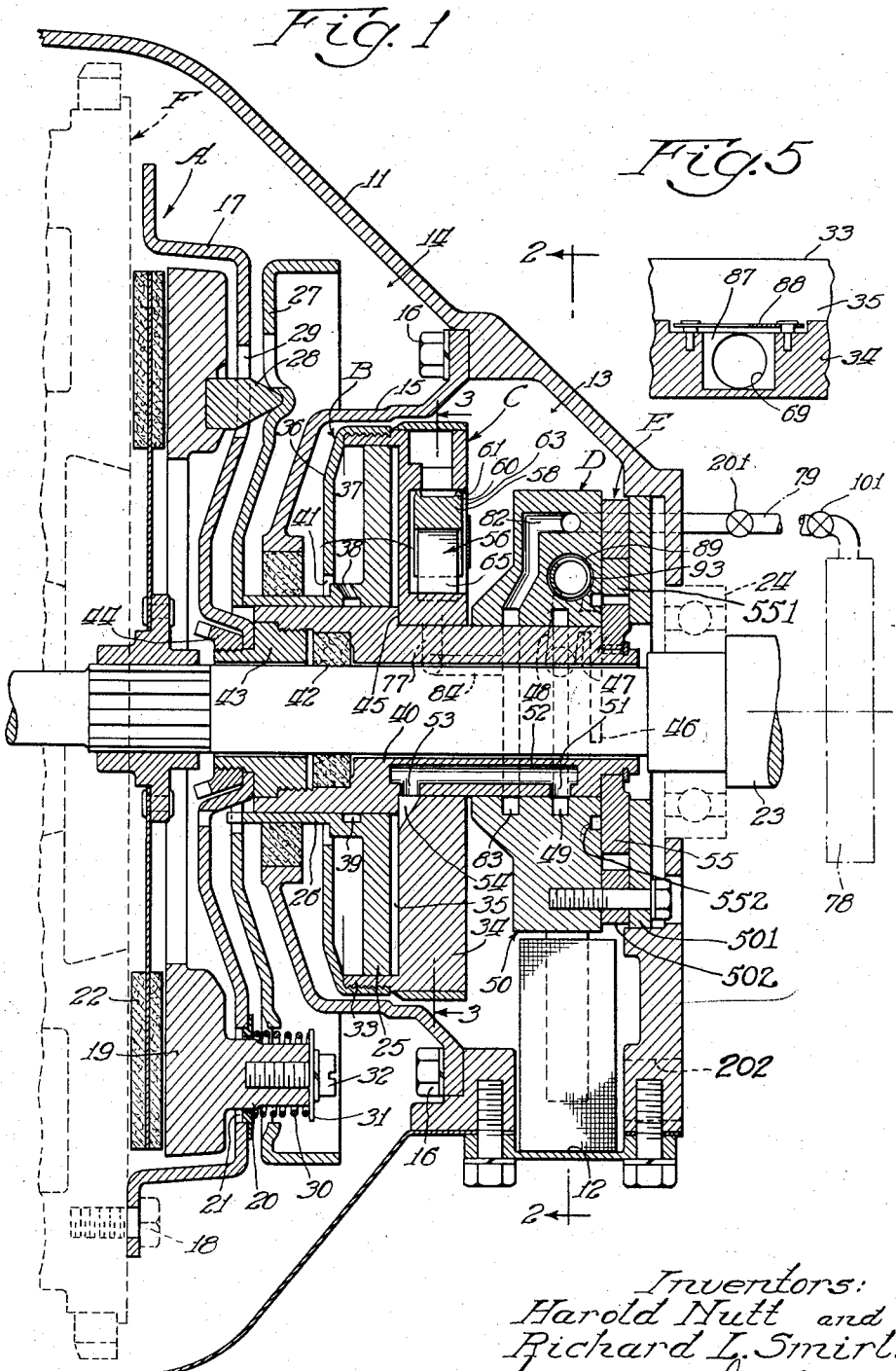
Fig. 1 is an axial sectional view of a clutch system embodying the invention.

The fluid operated clutch system shown in Fig. 1 as an example of one form in which the invention may be embodied, comprises generally a clutch A, a fluid motor B, for operating the clutch, a control valve and lock-out unit C for controlling the operation of the fluid motor automatically, manual control means D, and fluid pumping means E for supplying fluid under pressure to the motor B.

All of the mechanism briefly referred to above may be enclosed in a clutch housing 11 provided in its lower region with a sump 12 adapted to hold a body of fluid, such as lubricating oil, for operating the clutch. The fluid motor B, the control units C and D, and the engine driven pump E, may all be enclosed in a separate compartment 13, separated from the compartment 14 in which the clutch A is contained, by a partition wall 15 secured as at 16 to the housing 11.

The clutch A may include the conventional cover plate 17, secured as at 18, to the engine flywheel, indicated in dotted lines at F, a pressure plate 19 disposed inside the cover 17 and drivingly coupled therewith by means of lugs 20 formed on the pressure plate 19 and extending through openings 21 in the cover 17, and a conventional driven friction disc 22 adapted to be frictionally engaged between friction faces formed on the flywheel F and pressure plate 19 respectively. The driven disc 22 is splined upon the transmission shaft 23 which may be conventionally journalled in a bearing 24 mounted in the housing 11, and piloted at its forward end in the rear end of the engine crank shaft (not shown).

The pressure plate 19 is urged toward engaging position by the position 25 of the fluid motor B, transmitting thrust through a hub 26 to a reaction plate 27 against which one end of the hub 26 abuts, the reaction plate in turn transmitting the thrust to the pressure plate 19 through the medium of struts 28 mounted in the pressure plate 19 and extending through openings 29 in the cover 17.

Disengagement of the clutch is effected by retractor springs 30, each engaged at one end against the cover 17, and at its other end against a washer 31 tied to the pressure plate 19 by a lug 20 and securing element 32.

The motor B includes the piston 25 and a cylinder 33 in which the piston 25 is axially slidable. The cylinder 33 is formed as an axially extending flange on the cylinder head 34 which forms the housing of the control unit C. The piston 25, the cylinder 33, a sleeve 40, and the cylinder head 34 form the pressure chamber 35 into which the fluid under pressure is introduced, whereby the piston 25 may be moved toward the clutch A so as to effect engagement thereof. On the opposite side of the piston 25 there is formed, between the piston and an annular flange 36 projecting radially inwardly from the cylinder 33, a balancing chamber 37 into which fluid is allowed to leak from the chamber 35. Pressure on the piston 25 caused by centrifugal effect in the fluid in the balancing chamber 37 substantially neutralizes that of the fluid in the chamber 35 so as to enable the clutch to be released at high speed without the use of excessively heavy retractor springs 30. Fluid is delivered to the chamber 37 through a port 38 in the hub 26, communicating with an annular duct 39 which receives the leakage from the chamber 35 between the piston 25 and the sleeve 40 on which it is mounted and prevents the escaping oil being forced out, between the sleeves 26 and 40 to a region from whence it could not return to the sump. Excess fluid may leave the chamber 37 through the annular opening 41 formed between the flange 36 and the collar 26.

The sleeve 40 is centered by means of a pilot collar 43, and loosely keyed to the clutch cover plate 17 for rotation therewith, but has sufficient free play to take care of a slight amount of misalignment.

The automatic control unit C is mounted for rotation with the flywheel F and clutch cover 17, being secured upon the sleeve 40. It is located against a shoulder 45 formed in the sleeve 40. The fluid motor B, being unitary with the control unit C, also rotates with the flywheel.

Fluid under pressure for automatic clutch operation is supplied by the engine driven pump 55, which may be of the rotary vane type of construction as shown in detail in application Serial No. 209,450 filed by Harold Nutt and Harold V. Reed, on May 23, 1938, comprising a casing defined between the housing 50 of the manual control unit D, an annular plate 501, and a ring 502; and a rotor 55 which is mounted upon the sleeve 40 so as to be driven from the flywheel F. One of the vanes of the pump is shown in cross-section at 551.

The outlet of the pump, which lies entirely behind the plane of the section in Figure 1, and which comprises an elongated arcuate channel in the housing 50, is indicated at dotted lines at 46 in Figure 1. The inlet of the pump, which may be located substantially opposite the outlet, is not seen in Figure 1. The annular channel 552 in the housing 50, appearing in Figure 1, forms a continuation of the outlet port 46 and supplies fluid under pressure behind the vanes 551 for urging them outwardly.

From the discharge port 46, the fluid may pass through a short axially extending port 47 (Fig. 2) into a radial passage 48, thence into an annular duct 49, all formed in the housing 50 of the manual control unit D. The annular duct 49 communicates through a radial port 51 with an axially extending passage 52 which leads (Fig. 1) to a radial port 53 all formed in the sleeve 40. The port 53 communicates through a short inclined passage 54 in the cylinder head 34, with the pressure chamber 35 of the motor B.

Figure 3:
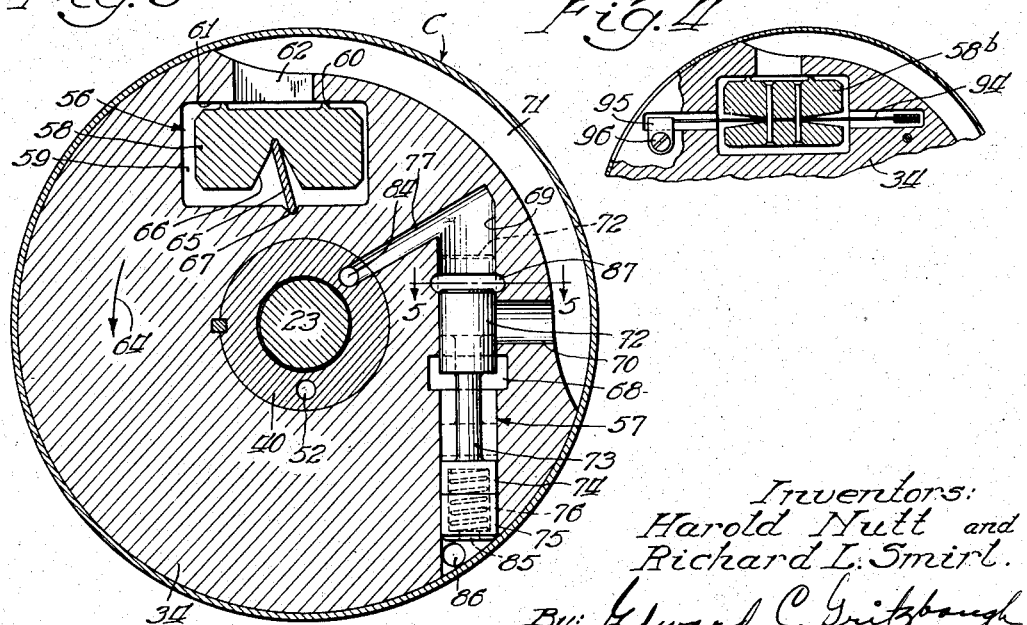
Fig. 3 is a transverse sectional view thereof, taken as indicated by the line 3—3 of Fig. 1.

Referring now to Fig. 3, the automatic control unit C includes the housing 34, the control valve, indicated generally at 56, and the lock-out device, which, in this form of the invention, comprises a valve, indicated generally at 57.

The control valve comprises a valve element 58 positioned in a valve chamber 59 formed in the disc 34, and having on one face an annular seating bead 60 adapted to engage a flat valve seat 61 formed on one side of the chamber 59 around a port 62. The fluid pressure existing in the chamber 35 of the fluid motor B is communicated to the control valve 56 through the port 62 so as to urge the valve toward open position. When open, the valve 56 allows a portion of fluid to escape from the motor B, past the valve and through the valve chamber 59 which is open at one side to provide a port 63, as shown in Fig. 1, in communication with the chamber 13 of the clutch housing 11, whereby the fluid may return to the sump 12.

The pressure of the fluid thus acting against the valve is opposed by centrifugal force developed in the valve element 58 in accordance with the speed of rotation of the control element C, urging the valve element radially outwardly against its seat 61. The valve is also urged toward seating position by inertia developed in the valve element 58 as a result of angular acceleration in the rotation of the automatic control element C. The direction of rotation is indicated by the arrow 64 in Fig. 3. A strut 65 is interposed between the valve element 58 and the side of the chamber 59 opposite the seat 61. The opposite ends of the strut 65 are seated respectively in a notch 66 in the valve element 58, and a notch 67 in the valve chamber 59. The strut 65 is inclined outwardly and toward the direction of rotation, whereby the inertia of the valve element 58 tends to cause it to move relatively in the opposite direction, and to straighten the strut 65 toward a position at right angles to the valve seat 61, resulting in the valve element 58 being urged outwardly against the seat.

The use of a strut, loosely notched into the valve element, as shown, is preferred because it is a relatively simple arrangement, but it will be understood that other means for suspending the valve element so as to resolve the inertial lag into outward seating pressure, could equally as well be employed from a functional standpoint.

In the form of the invention under consideration, the pressure fluid, in travelling from the motor B to the valve 56, must first pass the lockout valve 57. Accordingly, if the latter is closed, the valve 56 cannot function to relieve pressure in the motor, and the latter may thereby be subjected to the maximum pressure delivered by the pump, as determined by a control valve 90, which will be described more fully hereinafter. Communication between the pressure chamber and automatic control valve is established through a port 68 leading from the pressure chamber 35 into the chamber 69 of the lock-out valve 57, thence through a port 70, an annular duct 71 and the port 62 into the valve chamber 59 of the control valve. Such communication may be established when the lock-out valve piston 72 is in the position indicated in dotted lines in Fig. 3. In the full line position shown, the piston 72 cuts off communication between the pressure chamber 35 and the port 70, thereby rendering the control valve 56 inoperative.

The valve piston 72 is provided with a reduced waist portion 73 terminating in a skirt portion 74 forming a guide in connection with an end region of the chamber 69, in which it is slidable. Between the skirt 74 and a retainer cup 75 in the end of the chamber 69, is a compression spring 76 which urges the valve piston 72 toward its open position shown in dotted lines. The valve is adapted to be closed by the pressure of fluid introduced into the chamber 69 ahead of the piston 72 through a radial port 77 in the disc 34.

Fluid under pressure for operating the lock-out valve 57 is supplied by a transmission driven pump, indicated schematically at 78 in Fig. 1. The pump 78 may be driven by any portion of the power transmitting mechanism which is located between the driven clutch disc 22 and the drive wheels of the vehicle. The outlet of the pump 78 communicates through a suitable fluid path, such as a tube 79, through a shift valve 101 and a brake dump valve 201, a connection 80 (Figure 2) carried by the clutch housing 11, and a flexible union 81, with a passage 82 in the housing 50 of the manual control unit D. The brake dump valve 201 is for the purpose of releasing the pressure in the lock out line whenever the brake pedal is depressed, so that the clutch may be released from its locked out engagement and allowed to return to centrifugal operation, whenever the car is being slowed down by the application of the brakes. Such a valve, controlled from the brake pedal of the vehicle, is shown in Patent No. 2,230,050, issued in the names of Harold Nutt and Harold V. Reed January 28, 1941. The passage 82 leads to an annular duct 83 (Fig. 1) which communicates with an axial passage 84 (indicated in dotted lines) in the sleeve 40. The passage 84 (Fig. 3) communicates with the radial passage 77.

Provision is made for the pump 78 to become operative only when the transmission is adjusted to either the intermediate or high speed gear ratio, which ratios may, for convenience, be referred to as the "driving range." Such provision may be in the form of a suitable valve such as is indicated at 101 adapted to cut off the discharge from the pump 78 and to vent the passages 69, 77, 84, 82, 80 to the atmospheric pressure in the transmission when the transmission is adjusted to the "starting range," including neutral, reverse and low speed ratios. As a result, when the transmission is adjusted to the starting range, the lock-out valve 57 will be maintained by the thrust of the spring 76 in the open position shown in dotted lines in Fig. 3. The control valve 56 will thereby be maintained in communication with the chamber 35 of the fluid motor, and will automatically control the engagement and disengagement of the clutch in accordance with conditions of speed and acceleration.

When the discharge of the pump 78 is cut off, the fluid may be vented through a suitable relief valve incorporated in the pump 78.

When the transmission is adjusted to the driving range and it is no longer necessary or desirable for the clutch to operate centrifugally, fluid under pressure is delivered from the transmission pump 78 into the chamber 69 ahead of the valve element 72, forcing the same back against the pressure of the spring 76 until it cuts off communication between the ports 68 and 70, thereby rendering the control valve 56 ineffective to relieve pressure in the chamber 35, and allowing such pressure to build up to its maximum as determined by the combination control and relief valve 90 which will presently be described.

Fluid escaping past the skirt 74 of the valve piston 72 is vented to the sump through an opening 85 in the retainer cup 75, and a port 86 in the disc 34 so as to avoid the building up of fluid pressure behind the lock-out piston.

For push-starting of the vehicle, the transmission is shifted to either intermediate or high gear, and as the transmission is turned over by the wheels of the vehicle, the pump 78 will be operated and will deliver fluid into the chamber 69 of the lockout valve, from which it may pass through a port 87 (Fig. 5) into the pressure chamber 35, thereby building up pressure behind the piston 25 and moving the same to clutch-engaging position. At the same time, the lockout valve is closed so as to prevent escape through the control valve of the fluid thus delivered to the pressure chamber.

A check valve 88 (Fig. 5) prevents passage of fluid from the pressure chamber 35 through the port 87 into the lockout valve chamber 69 ahead of the valve element 72, during automatic operation of the clutch, so as to avoid the lockout valve being moved to closed position during this stage of operation. Leakage past the check valve is vented in the "starting range" by a groove 101a (Fig. 6) to assure that lockout does not occur when it is not desired.

Figure 2:
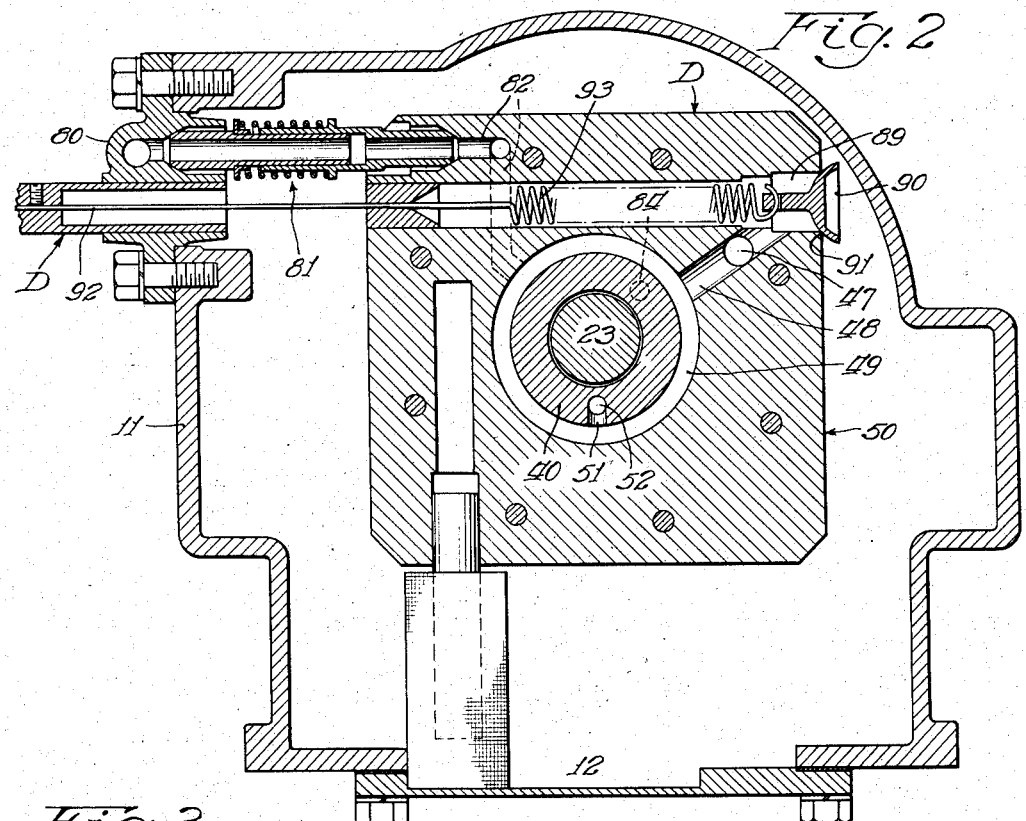
Fig. 2 is a transverse sectional view thereof, taken as indicated by the line 2—2 of Fig. 1.

Manual control of the clutch is effected by the manual control valve shown in Fig. 2. This valve includes a valve chamber 89 in the manual valve casing 50, a poppet type valve element 90 engaging the seat 91 formed by the junction between the chamber 89 and the end face of the casing 50, a control element 92 leading from a suitable control lever or pedal, and a resilient link, such as a coil spring 93, connecting the element 92 to the valve element 90. The resilient link 93 is of substantial length so as to allow the control pedal or lever to be moved through a fairly wide range of movement, whereby to gradually vary the tension on the valve element 90, and thereby gradually vary the pressure that the valve element 90 is able to maintain in the chamber 89. (In the fully engaged position, this valve governs the maximum pressure, and therefore acts also as a relief valve.) Since chamber 89 communicates with the pressure chamber 35 of the motor through the radial passage 48, the pressure which may be built up in the motor B may be correspondingly varied.

Figure 4:
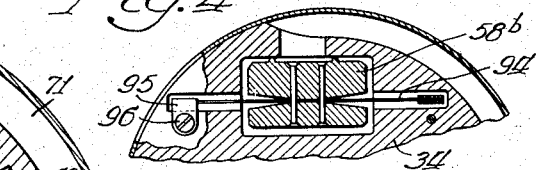
Fig. 4 is a transverse sectional view showing a modified form of the control valve.

In the modification of the invention shown in Fig. 4, the control valve element 58b is suspended on a flexible swing 94 anchored at its ends to brackets 95 secured to the disc 34, as at 96. The valve is located off center with respect to a radius of the disc 34, and is therefore sensitive to acceleration.

Referring now to Figs. 6 to 11, inclusive, the clutch system shown therein is similar to that described above, with respect to the clutch, the fluid motor, and the manual control unit D, but differs with respect to the pump arrangement and the automatic control unit C'. One element of difference which characterizes the several forms of the invention shown in these figures, is the arrangement of the two rotors 55a and 78a of the pumping mechanism E' so as to deliver fluid to the motor B through a common discharge outlet, indicated in dotted lines at 47 in Figure 6. The rotors 55a and 78a are arranged side by side, separated by an annular partition 504, in pump chambers defined, one by the casing 50, a peripheral ring 502, and the partition 504, and the other by the partition 504, a peripheral ring 503, and the annular plate 501. The rotor 55a is driven from the flywheel through the sleeve 40, being keyed to the end of the sleeve 40 as at 98. The rotor 78a is keyed at 99 to the driven shaft 23 so as to rotate therewith. Each rotor is provided with a series of radial vanes one each of which is shown in cross section at 551. Each rotor has associated with it an arcuate discharge port, the one for the rotor 55a being indicated in dotted lines at 46 and the one for the rotor 78a being indicated in dotted lines at 461. The ports 46 and 461 are connected by an axial passage 471 extending through the rings 502, 503, and 504 so as to discharge into the common port 47 leading to the valve chamber 89 and to the port 48 which communicates through the passage 51 with the axial passage 52 in the sleeve 40.

An annular passage 552 in the casing 50 communicates with the passage 48 to supply oil under pressure to the spaces 553 defined between the radially inner ends of the vanes 551 of the rotor 55a, and the inner extremities of the slots in which these vanes operate, the pressure thus developed behind the vanes serving to maintain them in sealed engagement with the interior surface of the peripheral ring 502. Fluid pressure is similarly applied to the vanes of the rotor 78a through an annular port 552 communicating with the spaces 553 through suitable openings in the partition 504.

Fluid for operating the lockout device is made available through a fluid line 100 communicating at one end with the common port 552, and at its other end with the passage 82 leading to the lockout device. Flow through the line 100 may be cut off and the line 100 vented to release the fluid behind the lockout piston when the transmission is adjusted to the starting range, and opened up when the transmission is adjusted to the driving range.

The invention contemplates a simple, but effective, arrangement for thus controlling the flow of lockout fluid in any of the forms of the invention herein disclosed. Such an arrangement includes a valve 101 interposed in the fluid line 100, and having three positions of adjustment, indicated in Fig. 6 as "high," "neutral," and "second," such positions corresponding to the similarly termed positions of adjustment of the transmission. When in the neutral position, as shown in full lines, the valve cuts off flow through the fluid line 100. When in the second gear position, a restricted port 102 in the valve allows restricted flow through the line 100. When the valve is in the high gear position indicated, a full diameter port 103 allows unrestricted flow through the fluid line 100. The restricted flow of fluid provided for in the second gear position gives a delayed closing of the lockout valve 87, which permits second gear automatic starts to be completed under average conditions before lockout occurs. Since no high gear starts are desired owing to excessive duration of slip, an unrestricted passage of lockout fluid is preferred to prevent excessive slipping of the clutch. (When the transmission free-wheels, it is not necessary to declutch manually for gear shifting.)

At low oil temperatures, the speed at which lock-out will occur tends to be lower than that at which lockout will occur at higher oil temperatures, due to the fact that the pumps will operate more efficiently when the oil is thick. This tendency is counteracted in second gear range by the restriction of the valve port 102. However, it was found that when the port is restricted enough to permit second gear engagement to be fully completed ahead of lock-out, under all conditions, the slip period may be unduly prolonged under heavy torque loads at high oil temperatures. To correct for this latter condition, the invention effects a compromise wherein, under colder temperature conditions, lockout may occur slightly before the completion of second gear engagement. The alternative type of control valve shown in Figs. 7 to 11 inclusive are designed to facilitate such correction by providing for the application of lockout pressure directly to the control valve so as to augment the pressure developed by centrifugal force, in an amount which gradually increases with unceasing speed, as will be more fully pointed out hereinafter.

The valve 101 has an operating lever 104 adapted to be engaged by a projection 105 which may be formed on the shift fork 106 which controls the shifting of the transmission into second and high speed gears. The shift fork 106 may be slidable on a rail 107 in accordance with standard practice in conventional shifting mechanisms, and may be engaged by the lower end 108 of the conventional shifting lever 109. When the shift fork 106 is moved to high gear position, the valve 101 will be correspondingly adjusted to the "high" position shown. The same is true of the second speed gear position. When the shift lever 109 is adjusted to neutral position, the valve 101 will be returned to the neutral position indicated. When the shift lever 109 is adjusted to reverse or low positions, the valve 101 will remain in the neutral position for the reason that the lever portion 108 shifts laterally to engage another shift fork, on another shift rail, for the low and reverse positions, and leaves the fork 106 in neutral position. The other fork and rail are not illustrated for the reason that they are of conventional construction. In the neutral position, oil in line 100 is vented through a groove 101a in valve 101 to atmospheric pressure inside the transmission case. This oil returns to sump 12 through a communicating passage 202 (Fig. 1).

An arrangement of control valve and lockout device that is operative in connection with the common circuit type of arrangement shown in Fig. 6, and one that has been found to be satisfactory in operation, is shown in Figs. 7, 8 and 9. Instead of the block type control valve with the swinging strut, we provide a piston type valve, indicated generally at 56a, including a piston 58a, slidable in the valve chamber 59a of a cylinder 110 and adapted to seat against a valve seat 61a at one end of the cylinder 110. When unseated, the valve allows fluid to escape from the pressure chamber 35 through a port 62a communicating with the valve seat 61a, into the cylinder 110, and thence out through a port 63a to the sump 12. When seated, the valve closes the port 62a so as to hold the pressure within the pressure chamber 35.

The lockout device in this form of the invention comprises a plunger 111, also slidable in the cylinder 110, having at one end a stem 112 adapted to engage the inner end of the control valve element 58a under pressure imparted to its other end by fluid entering the lockout chamber 69a through a passage 77a in the disc 34a. Communication between the fluid line 100 and the passage 77a may be the same as that shown and described in connection with Figs. 1 to 3. Communication between the lockout chamber 69a and the pressure chamber 35 is established through a port 87a controlled by a valve 88a which prevents reverse flow from the pressure chamber to the lockout chamber.

When the transmission is adjusted to the driving range, fluid under pressure delivered to the chamber 69a through the valve 101 and fluid line 100, will advance the lockout piston 111 into engagement with the control valve 58a, whereby the pressure from the pumps will be applied to both ends of the control valve piston 58a, and the latter will therefore be maintained in closed position by a compression spring 113, disposed in the valve chamber 59a, between the inner end of the valve piston 58a and an annular abutment member 114 pressed into the cylinder 110.

When the transmission is adjusted to the starting range, no fluid will be delivered to the lockout piston 111 from the pumps, and the check valve 88a and the vent 101a will prevent fluid reaching the lockout piston from the pressure chamber 35. Accordingly, there will be no fluid pressure against the inner end of the control valve element 58a, and the valve element will therefore react in accordance with the force of fluid pressure, acting against its outer end, opposed by centrifugal force and torsional inertia.

The torsional inertia effect is provided for in this form of the invention by positioning the valve chamber 110 on an axis that is inclined with respect to a radius of the disc 34a passing through the center of gravity of the valve element 58a. The direction of rotation being as indicated by the arrow 64a in Fig. 7, and the seating end of the valve being opposed to the direction of rotation, acceleration will hasten the seating of the valve.

The centrifugal effect is retained by locating the valve axis also at an angle to a tangent T to the path of rotation R of the center of gravity of the valve element 58a, at the radius R. The axis of the valve is therefore located at an angle intermediate the radius R and the tangent T.

The valve piston 58a and the lockout piston 111 may be made either separately, as shown, or as a single integral piston as shown in the pending application Serial No. 209,450 above referred to. However, it is preferred to make the piston separable, as shown, with the valve piston 58a loosely fitted in the chamber 110 so as to be freely movable therein, and the lockout piston 111 snugly fitted so as to hold the oil pressure. Being located in a portion of the chamber 110 which projects on the opposite side of its median line from that in which the valve piston 58a is contained, the lockout piston 111 is adapted to react to centrifugal force so as to move away from the valve element 58a when not under fluid pressure, thereby leaving the valve piston 58a free to move without interference from the stem 112. The outer limit of recession of the lockout piston 111 is determined by contact of a stem 115 on the piston 111, with a plug 116 closing this end of the cylinder 110 so as to form the lockout chamber 69a. The stem 115 prevents the lockout piston from closing the chamber 69a when in its retracted position.

The loose fitting of the valve piston 58a in the cylinder 110 also serves to minimize the danger of the valve sticking as a result of small particles of dirt entering the cylinder. Furthermore, the piston 58a may be made hexagonal or relieved in any manner so that the bearing engagement against the wall of the cylinder 110 may be confined to the narrow lands 117.

This form of the invention has several advantages over that previously described. In the first place, by arranging for a direct physical coaction between the centrifugal valve and the lockout device, it is possible to provide smooth second gear starts and to employ the less complicated fluid circuit and pumping arrangement embodying a common discharge from both pumps. Another advantage resides in the fact that the automatic control valve is responsive to deceleration as well as acceleration.

On the other hand, an automatic control valve of the piston type shown in Fig. 7 is more subject to sticking than the type shown in Fig. 3. The inclination of the valve with reference to both the radius R and the tangent T resolves the centrifugal force acting on the piston into two components, one of which tends to move the piston along its axis, and the other of which causes the piston to bear against the outer side of its cylinder. This latter component increases in accordance with the divergence between the valve axis and the radius.

Accordingly, although the arrangement shown in Fig. 7 has under test given satisfactory service, the invention contemplates a further improvement in which the advantages of direct physical coaction between the control valve and the lockout device are combined with the freedom of movement characteristic of the pivoted strut type valve. This improvement is shown in two forms in Figs. 10 and 11 respectively. In the form shown in Fig. 10, the control valve 56, all parts of which are designated by the same numerals as those used in Figs. 1 to 3, is associated with a piston type lockout element, indicated generally at 57b, through the medium of a lever 118, pivoted at 119 in a recess 120 communicating with the valve chamber 59, and extending at its other end into the chamber 69b of the lockout device 57b. A push rod 121 at one end engages the free end of the lever 118, and has a reduced portion 122 piloted in an opening 123 in said free end of the lever. The other end of the push rod 121 is piloted in a hole 124 in the piston 111b of the lockout device, and is yieldably engaged with the piston 111b through the medium of a frusto-conical compression spring 125, one end of which is engaged against a shoulder 126 on the rod 121, and the other end of which engages the piston 111b. Fluid under pressure is applied to the piston 111b through a passage 77b communicating at one end with the chamber 69b, and at its other end with the passage 84 of the sleeve 40. A port 87b establishes communication between the passage 77b and the pressure chamber 35 for conducting lockout fluid to the motor for push-starting. The port 87b is valved in the same manner as described in connection with the previous form of the invention.

The lever 118 multiplies the pressure received from the fluid acting on the piston 111b. During the centrifugal stage of operation, the lever 118 serves merely as additional centrifugal weight, and as a reaction point of fulcrum for the strut 65.

The port 62b opens directly into the pressure chamber 35, as in the form of the invention shown in Fig. 8. The spring 125, acting through the lever 118, serves to hold the valve 56 on its seat against gravity when the engine is at rest. This permits push-starting, since, if the valve 56 were open when the engine is at rest, the fluid delivered from the transmission pump would pass through the check valve 88 into the pressure chamber 35 and thence out through the valve port 62b without building up sufficient pressure to lift the piston 111b. Consequently, the valve 56 would remain open.

It may now be noted that in each of the common circuit arrangements shown in Figures 6 to 11 inclusive, there is a direct balancing of lockout pressure and centrifugal force on the one hand against the pressure in the chamber 35 on the other hand. Each increment of combined lockout and centrifugal pressure develops a corresponding proportional increment of pressure in the cylinder 35, i. e., the pressure of the fluid in the chamber 35 is directly proportional to the sum of lockout and centrifugal pressure. This feature, in combination with the restricted second gear port 102 in the lockout transmission line 100, has provided smooth automatic engagements under all conditions.

In the form of the invention shown in Fig. 11, the lockout piston 111c, spring 125c, push rod 121c, and cylinder 110c correspond to the similar elements 111b, 125, 121, and 69b, shown in Fig. 10. The valve 56c, however, is arranged in direct association with the push rod 121c, the multiplying lever being omitted, and the upper end 122c of the push rod being piloted in a hole 128 in the valve element 58c. The axis of movement of the valve element 58c is inclined intermediate a radius and tangent of its path of rotation so as to render the valve element responsive to both centrifugal force and torsional inertia. It is suspended out of contact with the sides of the chamber 59c, by three struts 65c, notched into the valve element and the housing 34c, at 66c and 67c respectively, the valve chamber 59c communicating with the pressure chamber through a port 62c, and with the interior of the clutch housing in the same manner as shown in Fig. 1.

In the operation of the system shown in Figs. 6 to 11 inclusive, the clutch, which may be of the same construction as that shown in Fig. 1, is, when the engine and vehicle are both motionless, maintained by the retractor springs 30 in disengaged position. Under a normal start, when the engine is first started, the rotation of the flywheel will be transmitted to the automatic control unit C, to the clutch pump, and to the tandem pump unit E'. The latter will commence to pump fluid into the motor B. During the early stage of operation, prior to the attainment of sufficient speed of rotation to cause the centrifugal control valve to close against the pressure of the fluid thus being delivered to the motor, such fluid will escape from the pressure chamber 35 through the ports 62a, 62b, or 62c, as the case may be, into the control valve chamber and thence through the port 63a, or 120, back to the sump 12 of the clutch housing. The transmission being adjusted to the starting range, flow of fluid through the fluid line 100 will be cut off, and the lockout mechanism will therefore remain inoperative, the lockout piston in the preferred forms of the invention being held in retracted position by centrifugal force so as not to hinder the free centrifugal action of the control valve.

Under slow acceleration of the engine, the control valve will respond chiefly to centrifugal force. Under fast acceleration, however, the control valve will respond to acceleration, and will close more quickly, i. e., at a lower speed than under slow acceleration. This compensates for the lag in completion of clutch engagement subsequent to the closing of the valve, such lag being occasioned by the necessity for building up the pressure to the engagement level, and the necessary period of time to move the pressure plate into contact with the clutch disc for initial transmission of torque.

When the transmission is shifted to the driving range, fluid from the pumping unit is routed through the fluid line 100 to the lockout chamber, causing the lockout piston to transmit positive closing pressure to the control valve, thereby preventing the latter from opening even though the speed of rotation should drop below the critical speed for centrifugal closing. This facilitates driving in traffic conditions where it may be desirable to slow down below such critical speed of the engine flywheel, without shifting the transmission back into low gear. This lockout condition will exist as long as the vehicle is being driven in either second or high gear. It prevents slippage of the clutch while operating in the speed range of centrifugal operation of the automatic control valve, and thereby minimizes wear on the clutch facings.

When the brake pedal is depressed, the clutch is prepared for centrifugal disengagement by the brake dump valve 201, which cuts off the admission of pressure into passages 82, 83, 77a, etc., and "dumps" or vents the oil in these passages and the lockout chamber. The lockout piston will then respond to centrifugal force and move to its retracted position, allowing the control valve to freely act under the pressure of the fluid in the pressure chamber and move to open position as soon as such pressure overbalances the combined effect of centrifugal force and the spring 113 or 125, as the case may be. The opening of the valve will release the pressure in the pressure chamber and allow the clutch retractor springs to disengage the clutch just before the vehicle comes to rest, thereby eliminating the necessity for doing this manually.

Under push-starting conditions, the control valve will be held in closed position by the spring 113 or 125 while the fluid output from the pumping unit is delivered simultaneously to the pressure chamber 35 and to the lockout chamber. The fluid pressure on both ends of the control valve being thus maintained in a balanced state, spring pressure will maintain the valve closed while the pressure builds up to the point of clutch engagement. The action of the spring, in the form shown in Fig. 7, may be assisted by a small excess of force behind the lockout piston over that acting against the seating end of the control valve piston, the diameter of the lockout piston being somewhat larger than that of the seating end of the valve piston. In the form shown in Fig. 10, the multiplication obtained through the lever 118 is sufficient at least to balance the pressure against the lockout piston 111b against the pressure acting on the larger area of the control valve element 58.

A detailed statement of the operation of the form of the invention shown in Figs. 1 to 3 has already been given and need not be repeated here.

The employment of a centrifugal valve which regulates the pressure in the pressure chamber of the clutch, by direct transmission of the centrifugally developed pressure to the fluid in the chamber, has proven to be a distinct improvement over the earlier proposed centrifugal valve designed to simply regulate the flow of the fluid from the pressure chamber without directly impressing the centrifugal force upon the fluid in the chamber.

One advantage of the "pressure regulating" valve of the present invention is that it eliminates the necessity for employing strong reactance springs to oppose the action of centrifugal force in controlling the movements of the valve, the opposing pressure being supplied by the fluid acting against one end of the valve element. Where strong reactance springs are employed, difficulty in securing lockout is experienced, whereas the present invention produces the lockout without difficulty, and by a proportional action which gives smoother engagement.

Another advantage of the valve of the present invention is that it permits of considerable simplification as contrasted to prior arrangements.

Another of the improvements contemplated by the present invention is the arrangement of the control valve to respond both to its centrifugal force and its torsional inertia. A complete discussion of this feature has already been given herein and need not be repeated here.

Another important improvement contemplated by the present invention is the arrangement wherein the lockout fluid is delivered not only to the lockout mechanism, but also to the pressure chamber of the fluid motor, through a check valve, the same as the fluid for centrifugal engagement. This is true in all forms of the invention shown herein, whether the pumps deliver through a common outlet port, or through separate circuits. Since either or both pumps feed fluid directly to the fluid motor, control of the pressure therein can be effected by varying the load on the manual control valve spring, and thereby engagement or release of the clutch can be made at any car speed under accurate control. This is especially important when the clutch is released at high car speed, and the engine allowed to idle. The manual control valve being in full control of the pressure in the fluid motor, it is impossible for the pumps to cause the pressure to build up quickly again to the clutch engagement level if the valve is not in the position of full spring extension corresponding to full clutch engagement pressure. When it is desired to reengage the clutch, such reengagement may be accomplished gradually under full control by the operator, by slowly releasing the clutch pedal so as to gradually increase the tension on the manual control valve spring, thereby gradually building up the pressure to the engagement level.

Another improvement contemplated in the present invention is the employment of a lockout plunger, physically associated with the control valve so as to transmit pressure directly thereto, but separate therefrom so as to be adapted to move away from the control valve when not subject to the pressure of the lockout fluid, and thereby allow the control valve to move freely in the centrifugal stage of operation without hindrance from the lockout mechanism. This arrangement also makes it possible for the control valve to be loosely mounted in its chamber so as to further facilitate freedom of movement.

Another advantage of the invention, as embodied in the form shown in Fig. 6, is the simplified pumping arrangement and pumping circuit which is made possible in this construction.

The separate circuit form of the invention shown in Figs. 1 to 3 is suitable for use with an automatic transmission where a separate oil pump is used for controlling the transmission shifting mechanism, and where it is important that the oil pressure delivered by this pump be maintained when the clutch is manually released at high car speed so that such automatic transmission will not suddenly shift to low or second gear as a result of the drop in oil pressure.

We claim:

1. In an automatic clutch system for a motor vehicle, a fluid operated clutch comprising driving and driven friction clutch elements, means for supplying fluid under pressure for operating the clutch, and a control valve rotatable with one of the clutch elements and responsive to the opposed forces of fluid pressure in the system, tending to open it, and centrifugal force and rotational inertia, tending to close it, said valve being adapted to automatically control the fluid pressure acting upon said clutch.

2. In an automatic clutch system for a motor vehicle, a fluid operated clutch, means for supplying fluid under pressure for operating the clutch, and a control valve including a rotatable valve housing and a valve element therein adapted to automatically control the application of fluid pressure to the clutch in response to both centrifugal force and rotational inertia developed in said valve element.

3. In an automatic clutch system for a motor vehicle, a fluid operated clutch including driving and driven friction clutch elements, means for supplying fluid under pressure for operating the clutch, and a control valve including a valve housing rotatable with the driving element and having a valve chamber provided with a valve seat, a block valve element in said chamber adapted to engage said seat under the effect of centrifugal force, and a pivotal connection between said valve element and said valve housing, adapted to guide said valve element toward seating position under the effect of rotational inertia of said valve element.

4. In an automatic clutch system for a motor vehicle including a change speed transmission having a starting range and a driving range, a fluid operated clutch, means for supplying fluid under pressure for operating the clutch, a control valve including a valve housing and a speed and rotational inertia responsive valve element arranged to open under pressure of the fluid acting on the clutch so as to limit such pressure in accordance with centrifugal force and rotational inertia developed in said valve element, and means, operative only when the transmission is adjusted to the driving range, to render said valve inoperative to limit said pressure.

5. In an automatic clutch system for a motor vehicle including a transmission having a starting range and a driving range; a fluid operated clutch, means for supplying fluid under pressure to said clutch for operating the same, a control valve including a rotatable valve housing and a speed and torsional inertia responsive valve piston therein arranged to be urged toward open position by fluid pressure applied to the clutch and toward closed position by centrifugal force and torsional inertia so as to automatically control the pressure of the fluid acting on the clutch, and fluid operated means, operative only when the transmission is adjusted to its driving range, for rendering said valve inoperative to relieve pressure.

6. In an automatic clutch system for a motor vehicle including a change speed transmission having a starting range and a driving range; a fluid operated clutch, means for supplying fluid under pressure for operating the clutch, a control valve including a rotatable valve housing and a speed and torsional inertia responsive valve element therein arranged to open under pressure of the fluid acting on the clutch so as to limit such pressure in accordance with centrifugal force and torsional inertia developed in said valve element, a lockout piston rotatable with said control valve and mechanically connected thereto, and means for conducting fluid to said piston when the transmission is adjusted to the driving range, whereby to lock said valve in closed position.

7. In an automatic clutch system for a motor vehicle including a change speed transmission having a starting range and a driving range, a fluid operated clutch, means for supplying fluid under pressure for operating the clutch, a control valve including a valve housing rotatable with the driving element and having a valve chamber and a control piston therein arranged to be urged toward open position by fluid pressure acting on the clutch and toward closed position by centrifugal force, a lockout piston in said chamber, and means, operative when the transmission is adjusted to the driving range, to direct fluid under pressure against said lockout piston, whereby to cause said lockout piston to engage the control piston and lock the latter in closed position irrespective of centrifugal force.

8. A clutch system as defined in claim 7, wherein said control piston is loosely mounted in the chamber, and the lockout piston has substantially fluid-tight engagement with the wall of the chamber.

9. A clutch system as defined in claim 7, wherein said control piston is loosely mounted in the chamber and said lockout piston has substantially fluid-tight engagement with the wall of the chamber and is arranged to be urged away from said control piston by centrifugal force when not acted upon by the lockout fluid.

10. In an automatic clutch system for a motor vehicle, a fluid operated clutch including driving and driven friction clutch elements, means for supplying fluid under pressure for operating the clutch, and a control valve including a valve housing rotatable with the driving element and having a valve chamber provided with a valve seat, a block valve element in said chamber adapted to engage said seat under the effect of centrifugal force, a strut inclined to the plane of said valve seat, having one end pivotally engaging the valve element opposite the seat and adapted to guide the valve element toward seating position under the effect of rotational inertia developed in the valve element, a lockout piston slidably mounted in said valve housing and adapted to transmit to the other end of said strut, thrust for moving the valve against its seat irrespective of inertia, and means, operative when the transmission is adjusted to the driving range, for conveying fluid under pressure to said lockout piston for operating the same.

11. In an automatic clutch system for a motor vehicle including gear shifting mechanism comprising a pair of shift rails, shifting forks carried by said rails and an actuator selectvely engageable with said forks, and a transmission having a starting range controlled by one of said forks and a driving range controlled by the other fork; a clutch, fluid operated speed responsive mechanism for automatic operation of the clutch, fluid operated lockout mechanism for locking the clutch in engagement irrespective of speed, and a valve, controlled by the fork which controls the driving range, for admitting fluid to said lockout mechanism for effecting lockout when the transmission is adjusted to the driving range.

12. In an automatic clutch system for a motor vehicle including gear shifting mechanism comprising a pair of shift rails, shifting forks carried by said rails and an actuator selectively engageable with said forks, and a transmission having a starting range controlled by one of said forks and a driving range controlled by the other fork; a clutch, fluid operated speed-responsive mechanism for automatic operation of the clutch, fluid operated lockout mechanism for locking the clutch in engagement irrespective of speed, and a valve, controlled by the fork which controls the driving range, for admitting fluid to said lockout mechanism for effecting lockout when the transmission is adjusted to the driving range.

13. In an automatic clutch system for a motor vehicle including a transmission having a starting range and a driving range; a clutch, a fluid motor for exercising a controlling effect upon the clutch, means for supplying fluid under pressure to said motor, speed-responsive mechanism for controlling automatic operation of the clutch, fluid operated lockout mechanism operative when the transmission is adjusted to the driving range to modify the action of said speed-responsive mechanism so as to cause the clutch to become locked in engagement irrespective of speed, a port for allowing fluid to pass from the lockout mechanism into said motor, and a one-way valve closing said port against passage of fluid therethrough in the reverse direction.

14. In an automatic clutch system for a motor vehicle including a transmission having a starting range and a driving range; a clutch, a fluid motor for exercising a controlling effect on the clutch, means for supplying fluid under pressure to said motor, a speed-responsive valve for controlling the pressure of the fluid in the motor for automatic operation of the clutch, said valve being arranged to be urged toward open position by the pressure of fluid in the motor and toward closed position by centrifugal force, fluid-operated lockout mechanism operative when the transmission is adjusted to the driving range to render said valve inoperative to relieve pressure, so as to cause the clutch to become locked in engagement irrespective of speed, a port for allowing fluid to pass from the lockout mechanism into said motor, and a one-way valve closing said port against passage of fluid therethrough in the reverse direction.

15. In an automatic clutch system for a motor vehicle including a transmission having a starting range and a driving range; a clutch including driving and driven friction clutch elements, a fluid motor for exercising a controlling effect on said clutch, an engine driven pump, rotating with the driving element of the clutch, for supplying fluid under pressure to said motor for normal operation thereof, speed-responsive means for controlling an automatic stage of such normal operation, a fluid-operated lockout mechanism for modifying the action of said speed-responsive means so as to cause the clutch to become locked in engagement irrespective of speed, a pump driven by the vehicle, adapted, when the transmission is adjusted to the driving range, to supply fluid to said lockout mechanism through conducting passages separate from those leading from the engine driven pump to the motor, a port for allowing fluid to pass from said lockout mechanism to said motor for operating the motor when the engine driven pump is inoperative, and a one-way valve closing said port against passage of fluid therethrough in the reverse direction.

16. In an automatic clutch system for a motor vehicle including a transmission having a starting range and a driving range; a clutch, a fluid motor for exercising a controlling effect on the clutch, means for supplying fluid under pressure to said motor, speed-responsive means for controlling automatic operation of the clutch, fluid operated lockout mechanism operative, when the transmission is adjusted to the driving range, to cause the clutch to become locked in engagement irrespective of speed, a port for allowing fluid to pass from the lockout mechanism to said motor, a one-way valve closing said port against passage of fluid therethrough in reverse direction, and manual control means including a valve chamber in communication with the fluid motor and having an outlet for releasing fluid, a valve closing said outlet, a manual control element, and resilient means connecting said manual control element to said valve.

17. In an automatic clutch system for a motor vehicle including a transmission having a starting range and a driving range; a clutch, a fluid motor for operating the clutch, means for supplying fluid under pressure to said motor, a speed-responsive valve arranged to be urged toward open position by the pressure of the fluid in the motor and toward closed position by centrifugal force, fluid operated lockout mechanism operative when the transmission is adjusted to the driving range to render said valve inoperative to release pressure whereby to cause the clutch to become locked in engagement irrespective of speed, a port for allowing fluid to pass from the lockout mechanism into said motor, a one-way valve closing said port against passage of fluid therethrough in reverse direction, and manual control means including a valve in communication with the fluid motor, adapted when opened to relieve the pressure of the fluid therein, a manual control element, and a yieldable connection between said manual control element and said valve.

18. In an automatic clutch system for a motor vehicle including a transmission having a starting range and a driving range; a clutch, a fluid motor for exercising a controlling effect on the clutch, means for supplying fluid under pressure to said motor, speed-responsive means for controlling automatic operation of the clutch, fluid operated lockout mechanism operative, when the transmission is adjusted to the driving range, to cause the clutch to become locked in engagement irrespective of speed, a port for allowing fluid to pass from the lockout mechanism to said motor, and manual control means including a valve chamber in communication with both said motor and said lockout mechanism and having an outlet for releasing fluid, a valve closing said outlet, a manual control element, and resilient tension means connecting said manual control element to said valve.

19. In an automatic clutch system for a motor vehicle, a clutch, a fluid motor for exercising a controlling effect upon the clutch, means for supplying fluid under pressure to said motor, speed responsive means for automatically varying the pressure of the fluid in said motor, and a combination manual control and pressure relief valve, adapted to be manipulated to reduce the pressure in the motor below that determined by the speed responsive device and adapted, when not under manual control, to automatically limit, at a predetermined maximum, the pressure developed in said motor by said fluid supply means and speed responsive means, said valve including means forming an outlet for releasing fluid from said motor, a valve closing said outlet, said valve tending to open under the fluid pressure in said motor, resilient means acting upon said valve so as to urge the valve toward its closed position in opposition to the fluid pressure, and control means for varying the tension in said resilient means.

20. In an automatic clutch system for a motor vehicle, a clutch, a fluid motor for exercising a controlling effect upon the clutch, means for supplying fluid under pressure to said motor, speed responsive means for automatically varying the pressure of the fluid in said motor, mechanism for manually controlling pressures in the motor, said mechanism including means forming an outlet for releasing fluid from said motor, a valve closing said outlet, said valve tending to open under the fluid pressure in said motor, resilient means acting upon said valve so as to urge the valve toward its closed position in opposition to the fluid pressure, and control means for varying the tension in said resilient means.

21. In a power transmission system for a motor vehicle including driving and driven members, fluid operated mechanism for establishing a drive connection between said members, means for supplying fluid under pressure to said mechanism for operating the same, and a control valve including a valve housing rotatable in timed relationship with one of said members and having a valve chamber, and a valve element in said chamber, movable in a path at an angle with reference to a tangent to the path of rotation of the center of gravity of said element and at an angle to a radius of the center of said path, passing through said center of gravity, said valve element being adapted to control the application of fluid pressure to said mechanism in response to both centrifugal force and rotational inertia developed in said valve element.

22. In a power transmitting system for a motor vehicle including driving and driven members and a change speed transmission having a starting range and a driving range, fluid operated mechanism for establishing a driving connection between said members, means for supplying fluid under pressure to said mechanism for operating the same, a control valve including a valve housing rotatable in timed relationship to the rotation of one of said members, said housing having a valve chamber, a valve element in said chamber, arranged for movement in a path disposed at an angle to a tangent to the path of rotation of the center of gravity of said valve element and at an angle to a radius of the center of said path passing through said center of gravity, said valve element being adapted to be urged toward open position by fluid pressure acting on said mechanism and toward closed position by the combined effect of its within developed centrifugal force and rotational inertia, whereby to control said fluid pressure, and means, operative when the transmission is adjusted to the driving range, to apply fluid pressure against said valve element so as to lock the same in closed position irrespective of the action of centrifugal force or rotational inertia.

23. In a power transmission system for a motor vehicle having driving and driven members, mechanism for establishing a drive between said members, fluid operated means for exerting a controlling effect on said mechanism, a pair of fluid pumps, driven by the driving and driven members respectively, arranged to deliver fluid under pressure to said fluid operated means for operating the same, and means for exerting control upon the pressure of said fluid, including a valve casing rotatable in timed relationship to the rotation of one of said members and a valve element therein arranged to respond to fluid pressure in said fluid operated means tending to open it and its within developed centrifugal force tending to close it.

24. In a power transmission system for a motor vehicle having driving and driven members, fluid operated mechanism for establishing a drive between said members, a pair of pumps, driven by the driving and driven members respectively, arranged to deliver fluid under pressure to said mechanism for operating the same, and means for exerting control upon the fluid pressure in said mechanism, said means comprising a manually operable valve and a centrifugal valve, the latter including a valve casing rotatable in timed relationship to the rotation of one of said members, and a valve element therein arranged to respond to the fluid pressure in said mechanism tending to open it and its within developed centrifugal force, tending to close it, said valves being adapted, in one combination of positions, to relieve the fluid pressure and in another combination of positions, to maintain the fluid pressure.

25. In a power transmission for a motor vehicle having driving and driven members, mechanism for establishing a drive between said members, a fluid system for exerting a controlling effect on said mechanism, said fluid system including a pair of fluid pumps, driven by the driving member and driven member respectively, said driving member operated pump being arranged to deliver fluid under pressure in said system and means for exerting control upon the fluid pressure in said fluid system, including a valve casing rotated by said driving member and a centrifugal force responsive valve element therein arranged to respond to fluid pressure in said fluid system tending to open it and the combined effect of its within developed centrifugal force and fluid pressure coming only from said driven member operated pump, tending to close it.

26. In a power transmission system for a motor vehicle having driving and driven members, fluid operated clutch mechanism for establishing a drive between said members, means for delivering fluid under pressure to said mechanism for operating the same, and means for exerting control upon the fluid pressure in said mechanism, including a valve casing rotatable in timed relationship with one of said members and a valve element therein arranged to respond to fluid pressure in said mechanism tending to open it and the combined effect of its within developed centrifugal force and fluid under pressure from said fluid delivering means, tending to close it.

27. In a power transmission for a motor vehicle having driving and driven members, and including a change speed transmission having a starting range and a driving range, including intermediate and high speed gear ratios, mechanism for establishing a drive between said members, a fluid system for exerting a controlling effect on said mechanism, said system including means for delivering fluid under pressure in said fluid system for normal drive control, and means for exerting control upon the fluid pressure in said fluid system, including a valve casing rotatable in timed relationship to the rotation of one of said members and a valve element therein arranged to respond to fluid pressure in said fluid system tending to open it and the combined effect of its within developed centrifugal force and fluid under pressure delivered from said fluid delivering means, tending to close it, and a flow restricting valve interposed between said fluid delivering means and said valve for restricting the flow of fluid which tends to close the valve, said flow restricting valve being arranged to be operative when the transmission is operating in the intermediate speed ratio.

28. In a power transmission system for a motor vehicle having driving and driven members, mechanism for establishing a drive between said members, a fluid motor for exerting a controlling effect upon said mechanism, means for delivering fluid under pressure to said motor, and means for exerting control upon the fluid pressure in said fluid motor, including a valve casing rotatable in timed relationship to the rotation of one of said members and a valve element therein arranged to respond to the pressure of fluid in said motor tending to open it and its within developed centrifugal force tending to close it.

29. In a power transmission system for a motor vehicle having driving and driven members, mechanism for establishing a drive between said members, fluid operated means for exerting a controlling effect upon said mechanism, said means including a fluid pressure chamber and an element therein movable under fluid pressure, and means for exerting control upon the fluid pressure in said chamber, including a valve casing rotatable in timed relationship to the rotation of one of said members and a centrifugal force responsive valve element therein, and a passage establishing communication at all times between the fluid in said chamber and said valve element so as to oppose the pressure of the fluid in said chamber against the centrifugal force developed in said valve element.

30. A power transmission system as defined in the preceding claim, wherein said valve casing is provided with a fluid escape port communicating with said passage, said valve element tending to close said port under the effect of centrifugal force.

31. In a power transmission system for a motor vehicle having driving and driven members, a clutch for establishing a torque transmitting connection between said members, a fluid motor for operating said clutch, means for delivering fluid under pressure to said motor, means providing a valve chamber rotatable in timed relationship to the rotation of one of said members, a centrifugal force responsive valve element in said chamber adapted to move under its within developed centrifugal force against the pressure of the fluid in said motor, toward a closed position wherein it permits the said pressure to build up in the motor for effecting clutch engagement, and fluid operated means for maintaining said valve element in clutch engaging position and to thereby lock out the clutch against centrifugal disengagement.

32. In a power transmission system for a motor vehicle having driving and driven members, a clutch for establishing a drive connection between said members, a fluid motor for operating said clutch, means for delivering fluid under pressure to said motor, means providing a valve chamber rotatable in timed relationship to the rotation of one of said members, a centrifugal force responsive valve element in said chamber adapted to move under centrifugal force against the pressure of the fluid in said motor, toward closed position wherein it permits said pressure to build up in the motor for effecting clutch engagement, and selectively operable means for directing fluid under pressure into said chamber for action against said valve element to maintain said element in said closed position and thereby lock out the clutch against centrifugal disengagement.

33. In a power transmission system for a motor vehicle having driving and driven members, a clutch for establishing a drive between said members, a fluid motor for operating said clutch, a pump, driven by the driving member, for delivering fluid under pressure to said motor for operating the same, means providing a valve chamber rotatable in timed relationship to the rotation of one of said members, a centrifugal force responsive valve element in said chamber adapted to move under centrifugal force against the pressure of the fluid in said motor toward a closed position wherein it permits fluid pressure to build up in said motor for effecting clutch engagement, and means including a pump driven with the driven member, for applying fluid under pressure into said chamber against said valve element to maintain the same in clutch engaging position and thereby lock out the clutch against centrifugal disengagement.

34. In an automatic clutch system for a motor vehicle, a fluid operated clutch including driving and driven friction clutch elements, means for supplying fluid under pressure for operating the clutch, and means for controlling said pressure, including a valve housing rotatable in timed relationship to the rotation of one of said elements and having a valve chamber provided with a valve seat, a block valve element in said chamber adapted to engage said seat under the effect of centrifugal force, and a strut inclined to the plane of said valve seat, having one end pivotally engaging the valve element opposite the seat and adapted to guide the valve element toward seating position under the effect of rotational inertia developed in the valve element.

35. In a power transmission for a motor vehicle having driving and driven members, means for establishing a drive between said members, a fluid system for exerting a controlling effect on said means, said system including means for developing pressure in the fluid and a control valve for controlling said pressure, said valve including means forming a valve chamber rotatable in timed relationship to the rotation of one of said members and a valve element in said chamber, arranged for movement in a path disposed at an angle to a tangent to the path of rotation of the center of gravity of said valve element and at an angle to a radius of the center of said path passing through said center of gravity, said valve element being adapted to be urged toward open position by fluid pressure acting on said mechanism and toward closed position by the combined effect of its within developed centrifugal force and rotational inertia.

36. In an automatic clutch system for a motor vehicle, a fluid operated clutch, means for supplying fluid under pressure for operating the clutch, and a control valve including means forming a rotatable valve chamber and a valve element therein, arranged for movement in a path disposed at an angle to a tangent to the path of rotation of the center of gravity of said valve element and at an angle to a radius of the center of said path passing through said center of gravity, said valve being adapted to automatically control the application of fluid pressure to the clutch in response to both centrifugal force and rotational inertia developed in said valve element.

37. In an automatic clutch system for a motor vehicle including a transmission having a starting range and a driving range; a fluid operated clutch, means for supplying fluid under pressure to said clutch for operating the same, a control valve including means forming a rotatable valve chamber and a valve element in said chamber, arranged for movement in a path disposed at an angle to a tangent to the path of rotation of the center of gravity of said valve element and at an angle to a radius of the center of said path passing through said center of gravity, said valve element being adapted to be urged toward open position by fluid pressure acting on the clutch and toward closed position by the combined effect of its within developed centrifugal force and rotational inertia, whereby to control said fluid pressure, and means, operative only when the transmission is adjusted to the driving range for rendering said valve element inoperative to relieve the fluid pressure in the clutch.

38. In a power transmission system for a motor vehicle including driving and driven members; mechanism for establishing a drive between said members, a fluid system for exerting a controlling effect on said mechanism, said system including means for developing pressure in the fluid in the system, speed responsive means for automatically varying the said pressure, said speed responsive means including means forming a valve rotatable chamber driven by one of said members and a valve element therein arranged for movement in a path disposed at an angle to a tangent to the path of rotation of the center of gravity of said valve element and means for over-controlling said pressure, said means including a vent, a valve for closing said vent, said valve tending to open under the pressure in said piston, resilient means acting upon said valve to urge it toward its closed position in opposition to the fluid pressure, and operator controlled means for loading said resilient means.

39. In a power transmission for a motor vehicle having driving and driven members, mechanism for establishing a drive between said members, and a fluid system for exerting a controlling effect on said mechanism, said system including a pair of pumps, driven by the driving and driven members respectively for developing pressure in the fluid, and means for exerting control upon said pressure, including means forming a rotatable valve chamber driven by one of said members and a valve element therein arranged for movement in a path disposed at an angle to a tangent to the path of rotation of its center of gravity, and adapted to respond to said fluid pressure tending to open it and its within developed centrifugal force tending to close it.

40. In a power transmission for a motor vehicle having driving and driven members, mechanism for establishing a drive between said members, and a fluid system for exerting a controlling effect upon said mechanism, including a pair of pumps, driven by the driving and driven members respectively, arranged to develop pressure in the fluid in said system, and control means comprising a manually operable valve and a centrifugal valve, the latter including means forming a rotatable valve chamber driven by one of said members and a valve element therein arranged for movement in a path disposed at an angle to a tangent to the path of rotation of its center of gravity, and adapted to respond to the fluid pressure in said system tending to open it and its within developed centrifugal force tending to close it, said valves being adapted, in one combination of positions to relieve the fluid pressure and in another combination of positions, to maintain the fluid pressure.

41. In a power transmission for a motor vehicle having driving and driven members, mechanism for establishing a drive between said members, and a fluid system for exerting a controlling effect on said mechanism, including a pair of fluid pumps, driven by the driving member and driven member respectively, said driving member operated pump being arranged to deliver fluid under pressure in said system for normal clutch operation, and means for exerting control upon said fluid pressure, including means forming a valve chamber rotated by said driving member and a valve element therein, arranged for movement in a path disposed at an angle to a tangent to the path of rotation of the center of gravity of said valve element and adapted to respond to fluid pressure in said system tending to open it and the combined effect of its within developed centrifugal force and fluid pressure from said driven member operated pump, tending to close it.

42. In a power transmission for a motor vehicle having driving and driven members, mechanism for establishing a drive between said members, a fluid system for exerting a controlling effect on said mechanism, means for delivering fluid under pressure in said system, and means for exerting control upon said pressure, including means forming a rotatable valve chamber driven by one of said members and a valve element therein arranged for movement in a path disposed at an angle to a tangent to the path of rotation of the center of gravity of said valve element and adapted to respond to fluid pressure in said system tending to open it and the combined effect of its within developed centrifugal force and fluid under pressure from said fluid delivering means, tending to close it.

43. In a power transmission for a motor vehicle having driving and driven members, mechanism for establishing a drive between said members, and a fluid system for exerting a controlling effect upon said mechanism, including a pair of fluid pumps, driven by the driving member and driven member respectively, adapted to develop pressure in the fluid in the system, speed responsive means for controlling said pressure, including means forming a rotatable valve chamber driven by one of said members and a valve element therein arranged for movement in a path at an angle to a tangent to the path of rotation of the center of gravity of said valve element, and adapted to respond to fluid pressure in the system tending to open it and its within developed centrifugal force tending to close it, and means for over-controlling said pressure, comprising a vent for releasing fluid from the piston, a valve controlling said vent, and operator controlled means for operating said valve.

HAROLD NUTT.
RICHARD L. SMIRL.